United States Patent [19]
Fukumori

[11] 3,953,773
[45] Apr. 27, 1976

[54] ANTI-LOCK BRAKE CONTROL CIRCUIT
[75] Inventor: Yukitsugu Fukumori, Yokohama, Japan
[73] Assignee: Nissan Motor Company Limited, Yokohama, Japan
[22] Filed: Dec. 11, 1974
[21] Appl. No.: 531,729

[30] Foreign Application Priority Data
Dec. 27, 1973 Japan.................................. 49-1291

[52] U.S. Cl.................................. 318/52; 318/269; 318/383
[51] Int. Cl.².......................................... B60T 8/08
[58] Field of Search ............ 318/52, 269, 270, 271, 318/383

[56] References Cited
UNITED STATES PATENTS

| | | | |
|---|---|---|---|
| 3,622,208 | 11/1971 | Krugler | 318/52 X |
| 3,675,583 | 7/1972 | Sobey et al. | 318/52 X |
| 3,811,082 | 5/1974 | Sutton | 318/383 |

Primary Examiner—Robert K. Schaefer
Assistant Examiner—W. E. Duncanson, Jr.

[57] ABSTRACT

A first train of pulses is generated at a first variable rate indicating the vehicle speed and a second train of pulses is generated at a second variable rate lower than the first rate indicating the wheel speed. A counter is provided having an input terminal receptive of the first train of pulses to count the same, a clear terminal receptive of the second train of pulses to clear the count and an output terminal at which a brake release signal is produced when the count reaches a predetermined number before it is cleared by one of the second train of pulses.

14 Claims, 6 Drawing Figures

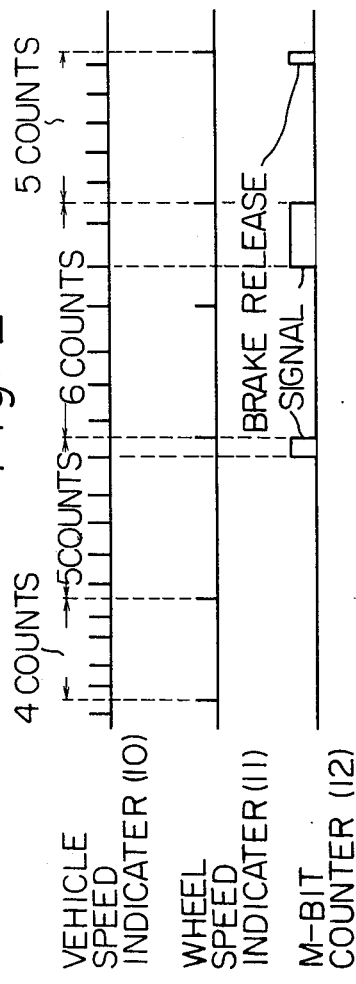
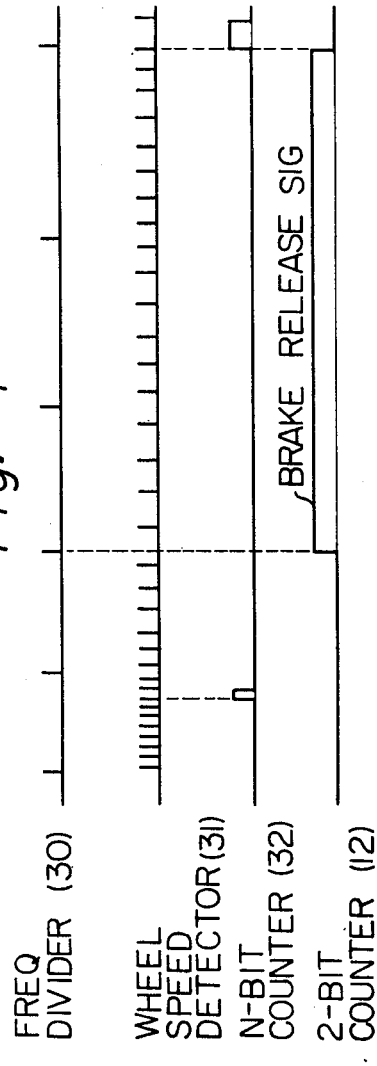

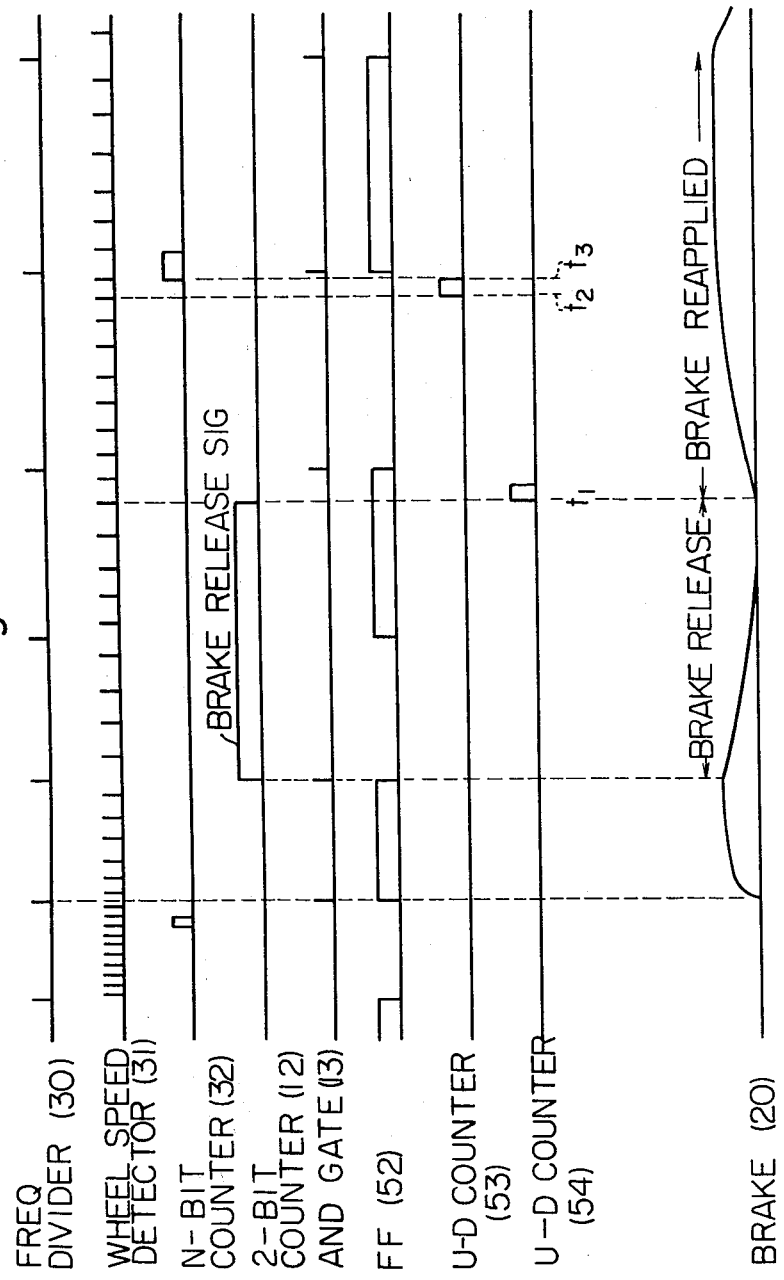

ANTI-LOCK BRAKE CONTROL CIRCUIT

The present invention relates to an anti-lock brake control circuit for a vehicle.

In order to detect a pre-skid condition, the ratio of wheel speed to vehicle speed must be determined to unlock the brake system. Determination of the wheel-to-vehicle speed ratio has involved demultiplication of the two variables which results in a complicated costly electronic circuit.

One object of the invention is to provide an anti-lock brake control circuit which is simple and economical.

In one aspect of the invention, the wheel-to-vehicle speed ratio is determined by counting the number of a first train of pulses indicating the vehicle speed and producing an output signal when a predetermined number is counted before the count is cleared by one of a second train of pulses which occur at a lower rate than the first train of pulses to indicate the wheel speed. The output signal occurs only when the number of the first train of pulses which occur during the corresponding time interval of the second train of pulses exceeds said predetermined number and is utilized as a brake release signal to unlock the brake system, of the vehicle.

In a second aspect of the invention, there is provided a wheel acceleration detector which comprises a first and a second up-down counter each being adapted to count up and down pulses which indicate the wheel speed in alternate periods determined by pulses indicating the vehicle speed and produce a signal when the down count exceeds the up count. The signal is used to clear the brake release signal to lock the brake again.

Another object of the invention is to provide an anti-lock brake control circuit which comprises a counter having an input terminal receptive of a first train of pulses indicating the vehicle speed, a clear terminal receptive of a second train of pulse indicating the wheel speed and occurring at a variable rate lower than the variable rate at which the first train of pulses occurs, and an output terminal which produces a brake release signal when a predetermined number of the first train of pulses is counted before the count is cleared by one of the second train of pulses.

These and other objects and features of the invention will become apparent when the following description is read in conjunction with the accompanying drawings, in which:

FIG. 2 is a diagram useful for understanding the operation of the circuit of FIG. 1;

FIG. 4 is a diagram useful for understanding the operation of the circuit of FIG. 3;

FIG. 6 is a diagram useful for understanding the operation of the circuit of FIG. 5.

Figure 1:
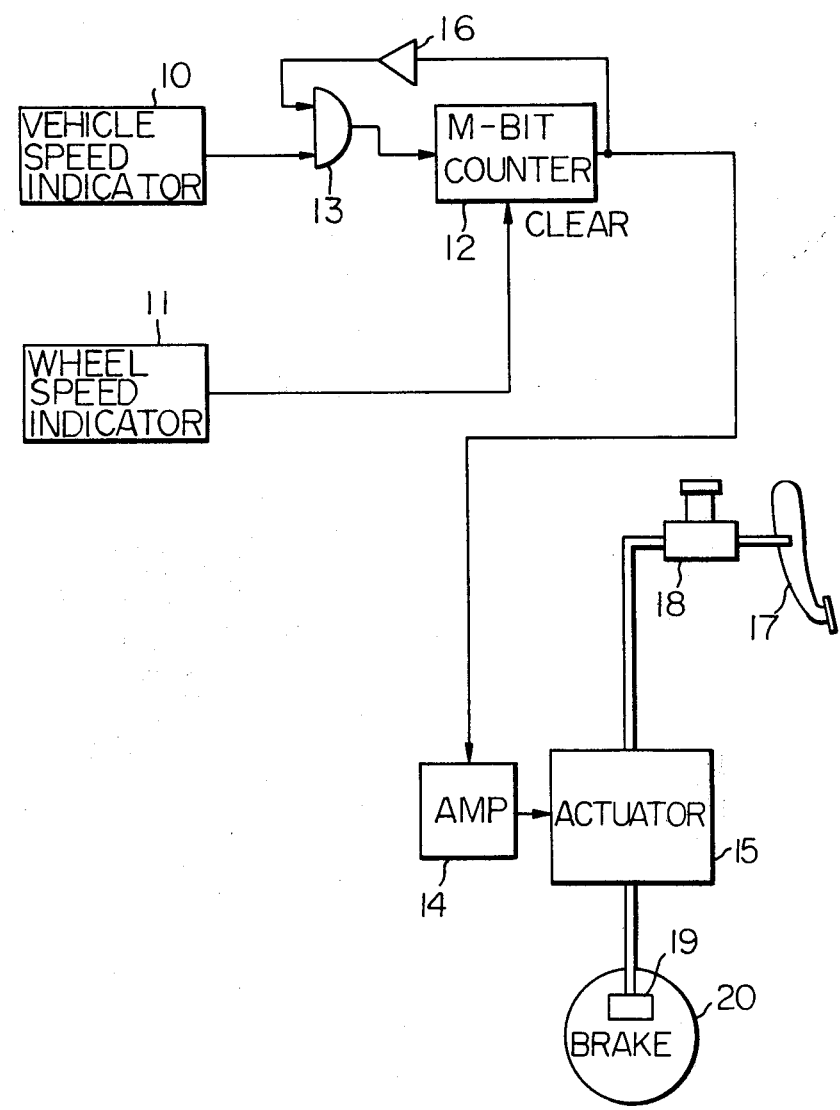
FIG. 1 is a schematic circuit diagram showing a first preferred embodiment of the invention.

Referring now to the drawings, particularly to FIG. 1, a skid control circuit embodying the present invention is shown and comprises a vehicle speed indicator 10 such as a conventional doppler radar which determines the relative motion of the vehicle to ground by measuring the shift in frequency of an echo and produces a train of pulses occurring at a first variable rate responsive to the frequency shift, i.e. the vehicle speed, and a wheel speed sensor 11 which determines the circumferential speed of a wheel of the vehicle by measuring the rotation of the drive axle and produces a train of pulses occurring at a second variable rate lower than the first variable rate of the vehicle speed sensor 10. The pulses from the vehicle speed indicator 10 are applied to an M-bit counter 12 by way of an AND gate 13 which is normally enabled. When "M"th bit is counted in the counter 12, it produces a brake release signal at the output terminal and applies it through amplifier 14 to an actuator 15. The M-bit counter 12 is coupled to the wheel speed sensor 11 such that the count therein is cleared by one of the pulses from the sensor 11. The brake release signal appearing on the output of the counter 12 has its polarity reversed by a NOT circuit and is applied to the AND gate 13 to disable the same. Therefore, it is appreciated that the brake release signal is maintained until the count stored in the counter 12 is cleared by the pulse from wheel speed sensor 11.

Assume that M-bit counter 12 has a capacity of 5 bits and with the vehicle under normal cruising or non-skid condition, the number of pulses produced by indicator 10 during the interval of the pulses from wheel speed indicator 11 is less than the capacity of the counter 12, so that no signal appears at the output terminal of the M-bit counter 12 (see FIG. 2). When the brake pedal 17 is depressed resulting in master hydraulic cylinder 18 supplying slave cylinder 19 with pressurized fluid so that brake 20 is placed under locked condition. With the brake 20 under locked condition and when a pre-skid condition develops in which wheel speed is smaller than vehicle speed by a predetermined amount, the number of pulses received in the counter 12 approaches its capacity (5 bits) to produce a DC output since the interval of the pulses from wheel speed indicator 11 is made longer to contain 5 bits of corresponding pulses from vehicle speed indicator. Once the DC output is produced, the NOT circuit 16 inverts its polarity to inhibit the AND gate 13 until the counter 12 is cleared by a subsequent pulse from the wheel speed indicator 11. The DC output is applied to actuator 15 via amplifier 14 as a brake relase signal to unlock the brake 20 until the counter 12 is cleared as described above. This process will be repeated until normal non-skid condition resumes.

Figure 3:
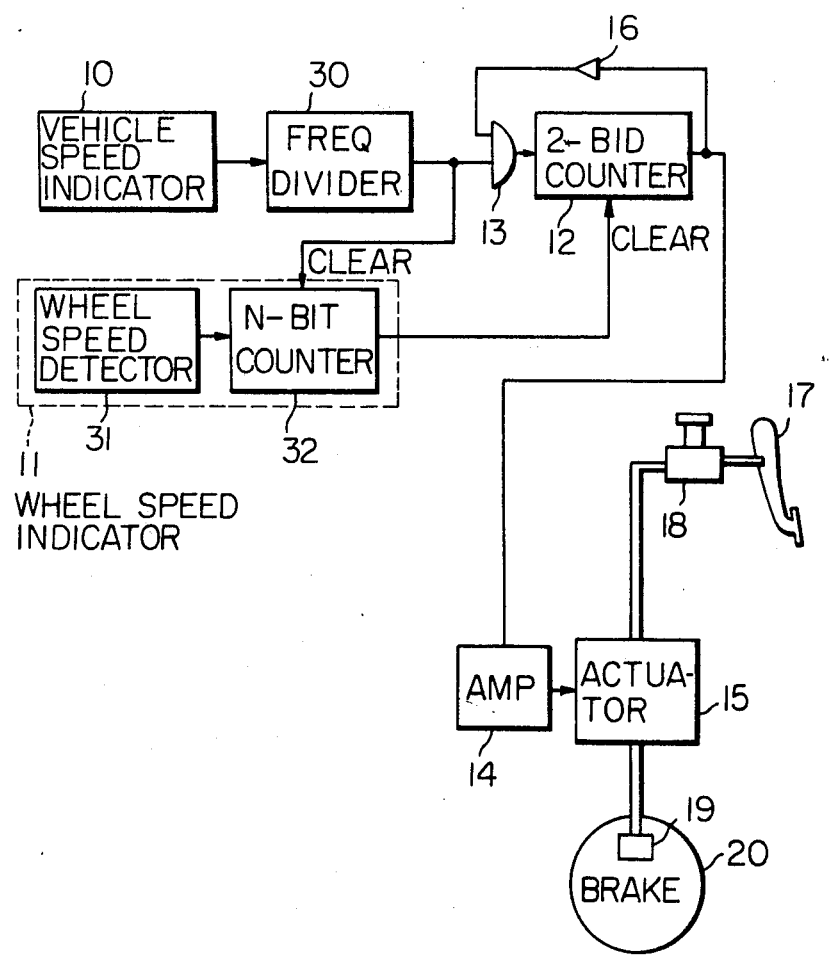
FIG. 3 is a schematic circuit diagram showing a second embodiment of the invention.

An alternative arrangement is shown in FIG. 3 which is generally similar to that shown in FIG. 1 except that the signal at the output of vehicle speed indicator 10 is applied to a frequency divider 30 in which the output pulse repetition frequency is an integral submultiple of the input frequency. The signal from the frequency divider 30 is applied to an N-bit counter 32 to clear the same which counts pulses from a wheel speed detector 31 which produces pulses at a repetition frequency higher than the repetition frequency of the output signal of the frequency divider 30 as shown in FIG. 4. The M-bit counter 12 is replaced with a 2-bit counter which produces a D.C. output when two bits of pulses are received.

Assume that the N-bit counter 32 has a capacity of 8 counts and with the vehicle being under normal non-skid condition, an output is produced from the N-bit counter 32 since more than eight pulses occur during the corresponding interval of the pulses supplied from frequency divider 30. When a pre-skid condition develops with the brake being under locked condition, the N-bit counter 32 is cleared before it counts eight and no signal appears at the output thereof. Upon the N-bit counter 32 being cleared, two bits are counted by 2-bit counter 12 producing a D.C. signal which is inverted in polarity and applied to the AND gate 13. If the pre-skid condition persists, the D.C. signal is present and applied as a brake release signal through amplifier 14 to actuator 15 to disable the same to unlock the brake 20. The length of the brake release signal is determined by the number of pulses to be counted by the N-bit counter 32 to produce a clear signal to be applied to the 2-bit counter 12.

Figure 5:
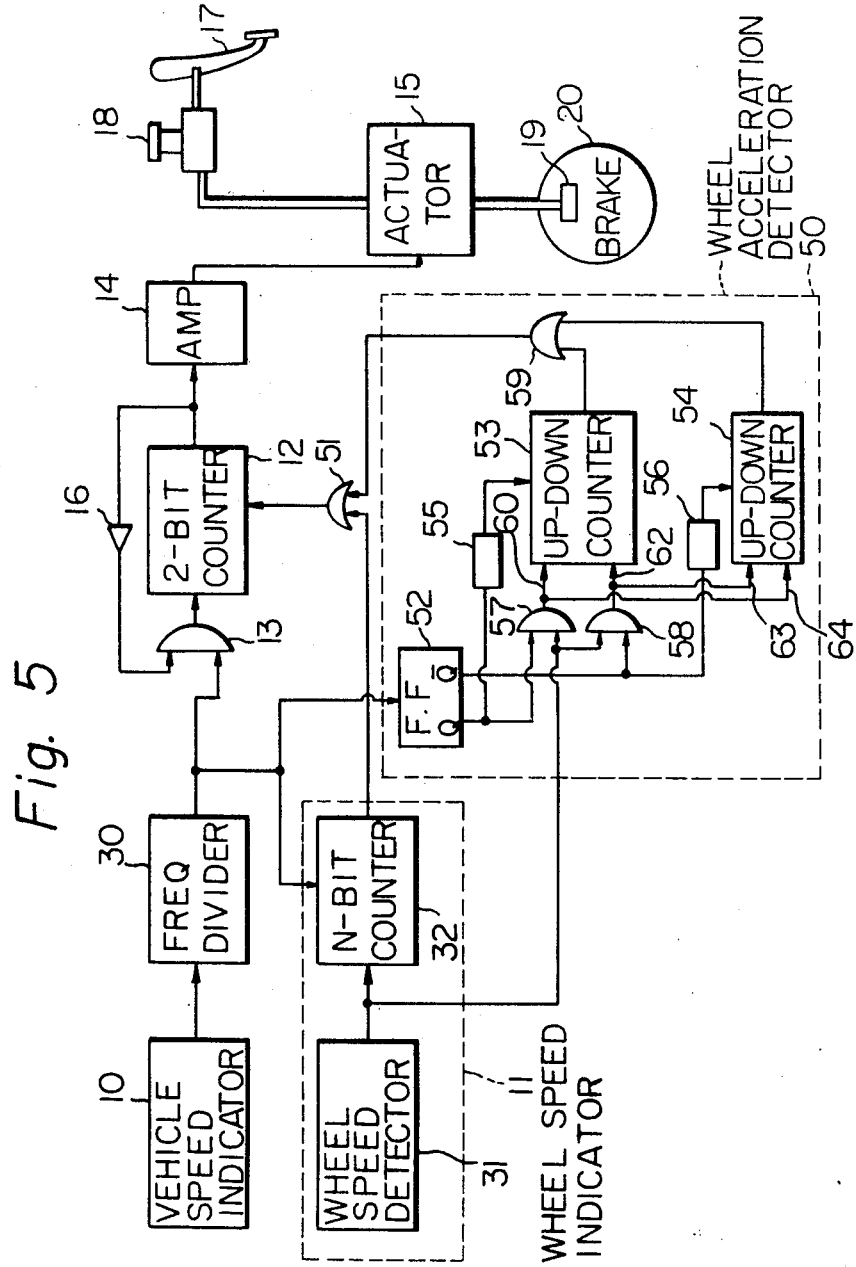
FIG. 5 is a schematic circuit diagram showing a third preferred embodiment of the invention.

A refined form of the embodiment of FIG. 3 is shown in FIG. 5 in which the brake release signal is removed to lock the brake again when the wheel is accelerated by a predetermined amount upon unlocking of the brake 20. In order to achieve this purpose, a wheel acceleration detector 50 is provided which comprises a flip-flop circuit 52 having its input coupled to the output of frequency divider 30, a first up-down counter 53 having its up-counting terminal 60 connected to an AND gate 57 and its down-counting terminal 62 connected to an AND gate 58 and a second up-down counter 54 having its up-counting terminal 63 connected to the AND gate 58 and its down-counting terminal 64 connected to the AND gate 57. The AND gates 57 and 58 have one of their input terminals connected to the output of wheel speed detector 31 and are arranged to be enabled alternately with each other by the other input terminals which are connected to the Q and $\bar{Q}$ outputs of the flip-flop 52. A first clear pulse generator 55 is connected between the Q output and the first up-down counter 53 to clear the residual counts and a second clear pulse generator 56 is connected between the $\bar{Q}$ output and the second up-down counter 54.

With these arrangements, the Q and $\bar{Q}$ outputs of the flip-flop 52 goes high in alternate relation in response to the pulses supplied from frequency divider 30. With the Q output being at high level, residual counts in the up-down counter 53 are cleared and AND gate 57 is enabled to pass the signal from wheel speed detector 31 to the up-down counter 53 over the upcounting terminal 60. The up-down counter 53 starts counting up the pulses from wheel speed detector 31 which occur during the interval defined by subsequent two pulses from the frequency divider 30. Simultaneously, these pulses are applied to the second up-down counter 54 over down-counting terminal 64 to permit the counter 54 to count down the previous counts. Upon the occurrence of a subsequent pulse from frequency divider 30, the Q output goes low while the $\bar{Q}$ output goes high and the up-down counter 53 starts down-counting whereby the previous counts stored in the up-counting mode are depleted by the incoming pulses. On the other hand, up-down counter 54 changes its state from down counting to up counting, with the residual counts, if any, being cleared by pulse generator 56. Therefore, the first and second up-down counters 53 and 54 operates in reverse relation to each other in synchronism with the pulses from frequency divider 30. These up-down counters are designed to produce a D.C. output or "borrow signal" when down counts exceed up counts. Therefore, a borrow signal is delivered from up-down counter 54 at time $t_1$ since the previous up counts are four while the down counts are five (see FIG. 6). The borrow signal is applied to the 2-bit counter 12 through OR gates 59 and 51 to clear the same. This permits the brake release signal to go low to thereby lock the brake again.

The provision of two up-down counters 53 and 54 is for the purpose of providing uninterrupted supervision of wheel acceleration and therefore the brake release signal is removed under the control of either of the two up-down counters.

The signal from the N-bit counter 32 is supplied through OR gate 51 to clear the same. In the event when the wheel accelerates at such a low rate that the wheel acceleration detector 50 produces no signal, the 2-bit counter 12 is forcibly cleared by the N-bit counter 32 which produces a signal when non-skid condition resumes as at time $t_3$ to enable the actuator 15 again to lock the brake 20.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An anti-lock brake control circuit for a vehicle having a plurality of braked wheels comprising:
    first means for sensing speed of the vehicle relative to ground and producing first pulses at a first variable rate indicating the vehicle speed;
    second means for sensing speed of the wheels and producing second pulses at a second variable rate lower than said first rate indicating the wheel speed;
    third means connected to said first means for counting the number of said first pulses and producing a brake release signal for releasing the brake applied to said wheels when the count therein reaches a predetermined number and further coupled to said second means such that said count is cleared by one of said second pulses; and
    fourth means for maintaining said brake release signal until said second pulse clears said count.

2. An anti-lock brake control circuit as claimed in claim 1, wherein said fourth means comprises an AND gate arranged to pass said first pulses to said third means and a NOT circuit for inverting the polarity of said brake release signal to disable said AND gate.

3. An anti-lock brake control circuit as claimed in claim 1, further comprising, in combination therewith, means for detecting wheel acceleration and producing a signal to clear said count in said third means.

4. An anti-lock brake control circuit as claimed in claim 3, wherein said third means is a 2-bit counter, and wherein said second means comprises a wheel speed detector producing third pulses in response to the wheel speed at a third variable rate higher than said first rate and a second counter arranged to count said third pulses to produce a second signal when the count therein reaches a predetermined number and coupled to said first means such that the count in said second counter is cleared by one of said first pulses, said second signal being applied to said two-bit counter to clear the count therein.

5. An anti-lock brake control circuit as claimed in claim 4, wherein said wheel acceleration detecting means comprises a first up-down counter arranged to count up and down the pulses from said wheel speed detector in alternate intervals of said first pulses and a second up-down counter arranged to count up and down said first pulses in reverse relationship to said first up-down counter.

6. An anti-lock brake control circuit as claimed in claim 5, wherein said first and second up-down counters are arranged to be cleared at every two of said first pulses.

7. An anti-lock brake control circuit as claimed in claim 5, wherein a flip-flop circuit is coupled to said first means to permit said first and second up-down counters to count in alternate manner.

8. In an anti-lock brake control circuit wherein the speed of a vehicle with respect to the ground is measured in terms of the number of pulses derived in response to the vehicle speed and compared with the number of pulses derived from measurement of the rotational speed of a wheel of said vehicle to produce a brake release signal when the rotational speed becomes smaller than the vehicle speed by a predetermined amount, the improvement comprising a counter for counting the number of said first mentioned pulses and arranged such that the count therein is cleared by one of said last mentioned pulses, said first mentioned pulses occurring at a variable rate higher than the variable rate at which the last mentioned pulses occur, and means for maintaining the presence of said brake release signal until said count is cleared by one of said last mentioned pulses.

9. The improvement as claimed in claim 8, wherein said maintaining means comprises an AND gate arranged to pass said first mentioned pulses to said counter and a NOT circuit for inverting the polarity of said brake release signal to disable said AND gate.

10. The improvement as claimed in claim 8, further comprising, in combination therewith, means for detecting wheel acceleration and producing a signal to clear said count in said third means.

11. The improvement as claimed in claim 8, wherein said counter is a 2-bit counter, and wherein said second means comprises a wheel speed detector producing pulses in response to the rotational speed of the wheel at a variable rate higher than the rate at which said first mentioned pulses occur and a second counter arranged to count the pulses from said speed detector to produce a second signal when the count reaches a predetermined number and arranged such that said count is cleared by one of said first mentioned pulses, said second signal being applied to said two-bit counter to clear the count therein.

12. The improvement as claimed in claim 11, wherein said wheel acceleration detecting means comprises a first up-down counter arranged to count up and down the pulses from said wheel speed detector in alternate intervals of said first mentioned pulses and a second up-down counter arranged to count up and down the pulses from said wheel speed detector in alternate intervals of said first mentioned pulses in reverse relationship to said first up-down counter.

13. The improvement as claimed in claim 12, wherein said first and second up-down counters are arranged to be cleared at every two pulses of said first mentioned pulses.

14. The improvement as claimed in claim 12, wherein a flip-flop circuit is coupled to said first means to permit said alternate counting of said first and second up-down counters.

* * * * *